United States Patent [19]

Feneberg et al.

[11] 4,055,378

[45] * Oct. 25, 1977

[54] SILICONE CONTACT LENS WITH HYDROPHILIC SURFACE TREATMENT

[75] Inventors: Paul Feneberg, Planegg; Ulrich Krekeler, Munich, both of Germany

[73] Assignee: Agfa-Gevaert Aktiengesellschaft, Leverkusen, Germany

[*] Notice: The portion of the term of this patent subsequent to May 25, 1993, has been disclaimed.

[21] Appl. No.: 566,603

[22] Filed: Apr. 10, 1975

Related U.S. Application Data

[63] Continuation-in-part of Ser. No. 517,096, Oct. 22, 1974, Pat. No. 3,959,105, which is a continuation-in-part of Ser. No. 318,853, Dec. 27, 1972, abandoned.

[30] Foreign Application Priority Data

| Dec. 31, 1971 | Germany | 2165805 |
| Oct. 25, 1973 | Germany | 2353495 |
| Apr. 11, 1975 | Germany | 2417660 |

[51] Int. Cl.² .............................. G02C 7/04
[52] U.S. Cl. ........................ 351/160; 204/165; 351/177
[58] Field of Search ............. 351/160, 177; 204/164, 204/165

[56] References Cited

U.S. PATENT DOCUMENTS

| 3,228,741 | 1/1966 | Becker | 351/160 |
| 3,431,046 | 3/1969 | Conrad et al. | 351/160 |
| 3,542,461 | 11/1970 | Girard et al. | 351/160 |
| 3,925,178 | 12/1975 | Gesser et al. | 351/160 X |
| 3,959,105 | 5/1976 | Feneberg et al. | 351/160 X |

Primary Examiner—David H. Rubin
Attorney, Agent, or Firm—Michael J. Striker

[57] ABSTRACT

A contact lens has a concave surface which is adapted to contact the cornea of an eye and a convex surface which is adapted to contact the eyelid. At least the convex surface of the lens possesses hydrophilic characteristics although the concave surface of the lens preferably possesses such characteristics also. In any event, the convex surface of the lens has a greater wettability than the concave surface thereof. The more highly hydrophilic character of the convex surface prevents the deposition thereon of fatty substances carried by the tear fluid which may cause opacity of the lens. The less highly hydrophilic character of the concave surface decreases the forces responsible for maintaining the lens in position in the eye, although not to such an extent that the lens does not remain properly positioned. These forces have been found to be a source of irritation in that they produce the feeling of a foreign body in the eye and the decrease in these forces occasioned by the less highly hydrophilic character of the concave surface of the lens enables this feeling to be eliminated. The concave surface of the lens need not be as highly hydrophilic as the convex surface thereof since the quantity of tear fluid which comes into contact with the concave surface is considerably less than that which comes into contact with the convex surface. The maximum contact angle for the convex surface of the lens, as measured with distilled water, should be about 65°. The surfaces of the lens may be made hydrophilic by chemical means or by bombardment with charged particles.

24 Claims, 1 Drawing Figure

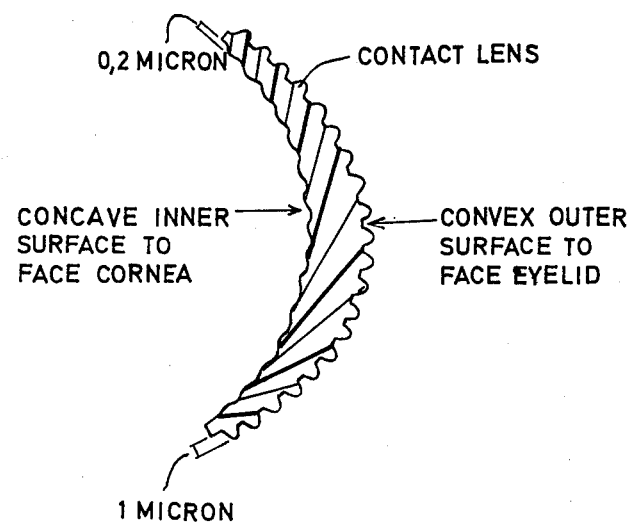

SILICONE CONTACT LENS WITH HYDROPHILIC SURFACE TREATMENT

CROSS-REFERENCE TO RELATED APPLICATIONS

This is a continuation-in-part of the copending application Ser. No. 517,096 filed Oct. 22, 1974 and now U.S. Pat. No. 3,959,105 issued May 25, 1976 which, in turn, is a continuation-in-part of the copending application Ser. No. 318,853 filed Dec. 27, 1972 and now abandoned.

BACKGROUND OF THE INVENTION

The invention relates generally to contact lenses.

Methods for making silicone elastomer-containing articles such as, for instance, contact lenses, hydrophilic are disclosed in applicants' prior applications Serial Nos. 318,853 and 517,096 which are commonly owned with the present application. With respect to the treatment of contact lenses, these methods basically involve subjecting the surfaces of a contact lens which contains or consists of a silicone elastomer to bombardment with charged particles, particularly ions, using a glow discharge. Application Ser. No. 517,096 is now U.S. Pat. No. 3,959,105 the disclosure of which is incorporated by reference herein.

In order to achieve optimum compatibility between such a silicone elastomer-containing contact lens and the user of the lens, the latter should be seated on the eye in such a manner that it can readily move on the eye. This is necessary since otherwise the edges of the lens may produce impressions in the eye by virtue of too firm a seating of the lens on the eye. The formation of such impressions in the eye is undesirable on physiological grounds. On the other hand, experiments have shown that the sliding of the lens on the cornea of the eye may cause a foreign body sensation to be produced when the concave side of the lens facing the cornea, and which side has been treated in accordance with applicants' above-referenced prior applications, is too strongly hydrophilic.

The same general considerations apply also to conventional contact lenses, that is, contact lenses which do not contain a silicone elastomer. Such contact lenses may also be made hydrophilic, for example, by chemical means such as disclosed in the German publication DT-OS 22 28 528 (corresponding to the U.S. application Serial No. 152,076 in the name of A. E. Barkdoll filed Nov. 16, 1971).

In addition to the above considerations, it must be taken into account that an important reason for providing a contact lens with a hydrophilic surface is to prevent soiling thereof by fatty substances liberated from the eyes. Thus, these substances, which are conveyed to the surface of the lens by the tear fluid, accumulate very rapidly on hydrophobic surfaces and will cause the lens, which is itself clear as glass, to become cloudy or opaque if the surface of the lens is hydrophobic.

The prior art has been unable to provide a contact lens which is capable of satisfactorily meeting the above requirements, that is, a contact lens which can readily move on the eye, which does not produce a foreign body sensation and which yet is not easily soiled. It is clear, therefore, that improvements in the state of the art are desirable.

SUMMARY OF THE INVENTION

It is, accordingly, a general object of the invention to provide a novel contact lens.

Another object of the invention is to provide a contact lens which enables the cloudiness or opacity described above to be substantially avoided and which, simultaneously, enables the foreign body sensation to be at least almost entirely eliminated.

These objects, as well as others which will become apparent as the description proceeds, are achieved in accordance with the invention. According to one aspect of the invention, there is provided a contact lens which comprises a body of transparent material having a concave surface portion adapted to face the cornea of an eye and a convex surface portion adapted to face the eyelid. At least the convex surface portion possesses hydrophilic characteristics and, in any event, the convex surface portion has a greater wettability than the concave surface portion. In other words, the contact angle for the convex surface portion always has a smaller value than that for the concave surface portion.

The difference between the contact angle for the convex surface portion or surface and that for the concave surface portion or surface should be about 5° at a minimum and, preferably, at least about 10°.

In accordance with the invention, the contact angle for the convex surface favorably does not exceed about 65° whereas the contact angle for the concave surface advantageously does not exceed about 75°. It is preferred when the contact angle for the convex surface is at least about 10° and when the contact angle for the concave surface is at least about 60°.

It is pointed out that the contact angles referred to herein are all as determined with distilled water.

A preferred embodiment of the invention contemplates for the material of the lens to comprise or consist essentially of a hydrophilic silicone elastomer. A particularly advantageous form of the contact lens is one wherein the lens includes a silicone elastomer or silicone rubber, and silicone dioxide as a filler. However, the invention is also applicable to contact lenses which are constituted by conventional lens materials such as, for example, polymethylmethacrylate or Plexiglass.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a greatly enlarged sectional view of one form of a contact lens in accordance with the invention.

DESCRIPTION OF THE PREFERRED EMBODIMENTS

The invention relates to a contact lens having at least one side or surface which possesses hydrophilic characteristics.

According to one aspect of the invention, as indicated previously, the lens is designed in such a manner that the convex outer side of the same which comes into contact with the eyelid possesses a higher degree of wettability than does the concave inner side of the lens which comes into contact with the cornea of the eye.

For the case of lenses comprising a silicone elastomer or silicone rubber, such a construction is favorably achieved by treating a lens in accordance with the methods described in applicants' above-referenced, commonly-owned prior applications but carrying out the treatment differently for the inner and outer surfaces, that is, the concave and convex sides, of the lens so as to make these surfaces hydrophilic to different degress. On the other hand, conventional lenses may be made hydrophilic by means of chemical methods such as, for example, that disclosed in the above-referenced German publication DT-OS 22 28 528, and, for the case of these conventional lenses, a different treatment for the inner and outer sides of the lens so as to make them hydrophilic to different degrees is likewise possible.

For a fuller appreciation of the invention, it is pointed out that, as a result of experimentation, it has been found that many persons who wished to use the PMMA (polymethylmethacrylate) lenses which have already been available on the market for a fairly long time were unable to do so satisfactorily since, for these persons, such lenses become soiled very rapidly. Such persons have, with very good results, been provided with silicone elastomer-containing lenses which have been made hydrophilic in accordance with the methods described in applicants' above-referenced prior applications. A soiling or clouding of the lens surface was no longer observable. However, many persons now complained about a foreign body sensation in the eyes, which sensation they were accustomed to from the so-called "hard " PMMA lenses. It was found that the forces of adhesion arising between the cornea of the eye and the hydrophilic inner side of the lens was a cause of this foreign body sensation. These forces of adhesion play as important role in the centering of the lens on the eye.

A further reason for the foreign body sensation resides in that a surface roughness is produced when a silicone elastomer-containing lens is made hydrophilic according to the physical methods described in applicants' above-referenced prior applications. Depending upon the intensity and the duration of the treatment, the surfaces of the lens may be caused to have a greater or a lesser roughness.

Experiments carried out with lenses having different degrees of wettability have now demonstrated that the wettability of the inner side of a contact lens, that is, the side of a contact lens which is adapted to face the cornea of an eye, need not, by far, be as good as that of the outer side of the lens, that is, the side of the lens which is adapted to face the eyelid. The reason is that the predominant part of the tear fluid found in the eyes is always brought into contact with the outer surface of the lens by the eyelid whereas only a small quantity of the tear fluid penetrates between the lens and the cornea of the eye.

In order to obtain optimum results in practice, the outer surface of a contact lens is favorably treated to such an extent, for instance, for the case of a silicone elastomer-containing lens by the methods described in applicants' above-referenced, commonly-owned prior applications, that the greatest possible wettability is achieved. In this manner, a soiling or clouding of the outer surface of the lens may be substantially completely avoided.

If now, in accordance with the invention, the inner side of the contact lens is also subjected to a treatment imparting hydrophilic characteristics thereto but is treated less intensively than the outer side of the lens, then it is true that the inner side of the lens will possess a correspondingly lesser wettability than the outer side thereof. Nevertheless, a soiling or clouding of the inner side of the lens will not occur, at least to any substantial extent. Moreover, while it is true that the forces of adhesion acting on the surface of the cornea of the eye will be lower than if the inner side of the lens had been treated more intensively, the lens is, however, found to have a well-centered seating on the eye. On the other hand, by virtue of the lessening of the degree to which the inner side of the lens is hydrophilic according to the invention, there is now observed, as a result of the decrease in the forces of adhesion, a distinct reduction in, and even a disappearance of, the foreign body sensation in the eyes. Thus, a lens made in accordance with the invention can be worn around the clock without difficulty.

As mentioned previously, the surfaces of a lens may become roughened due to the treatment which is used for imparting hydrophilic characteristics thereto. It has been found that the optimum surface roughness for the inner side of the lens is about 0.2 microns or less. However, most of the persons used for experimental purposes were still able to tolerate a surface roughness of up to about 0.5 microns. In contrast, the surface roughness of the hydrophilic outer surface of the lens is of the order of 1 micron. A lens having a relatively highly hydrophilic, relatively coarse outer surface and a less highly hydrophilic, finer inner surface is illustrated in the single FIGURE.

For lens surfaces which have been made hydrophilic using chemical methods, it has been found that a contact angle, as measured with distilled water, of approximately 70° for the inner side of the lens is particularly advantageous. Insofar as the outer side of such a contact lens is concerned, the contact angle should be at most about 65° in order to obtain a good compatibility.

Generally speaking, that is, both as regards silicone elastomer-containing lenses and as regards more conventional lenses such as polymethylmethacrylate lenses, the contact angle for the convex outer surface should not exceed about 65°. It will be recalled that the contact angles referred to herein are as measured with distilled water. Furthermore, the contact angle for the convex outer surface should favorably be about 10° at least. A preferred embodiment of the invention contemplates for the contact angle of the outer surface to be in the range of about 30° to 45°.

Again generally speaking, the contact angle for the concave inner surface preferably does not exceed about 75° and is favorably a minimum of about 60°. An advantageous embodiment of the invention provides for the contact angle of the concave inner surface to be between about 70° and 75°. It will be understood that the contact angle for the inner side of the lens should be such as to permit the contact lens to be properly seated on the eye.

In any event, the contact angle for the convex outer side of a lens is always less than that for the concave inner side of the lens according to the invention. In other words, the outer side of a lens is always more hydrophilic than the inner side thereof. The difference between the contact angle for the outer side of a lens and the contact angle for the inner side thereof should be a minimum of about 5°. Preferably, this difference is approximately 10° at least.

The following illustrations are presented in order to further bring out the features of the invention but are not to be construed as limiting the same in any manner. Thus, for illustrative purposes, it is pointed out that a good lens in accordance with the invention may have a contact angle of 60° for the concave inner surface thereof and a contact angle of 30° for the convex outer surface thereof. On the other hand, a lens according to the invention which is adequate for use may have a contact angle of 75° for the concave inner surface thereof and a contact angle of 65° for the convex outer surface thereof.

It may be pointed out that a lens in accordance with the invention favorably, but not necessarily, comprises or consists essentially of a hydrophilic silicone elastomer. An advantageous embodiment of the invention contemplates a lens containing silicone rubber and silicon dioxide as a filter.

The following Example is intended to further illustrate the invention and is not intended to limit the invention in any manner. This Example describes the treatment of a silicone elastomer-containing lens in accordance with a method such as described in applicants' above-referenced prior applications.

EXAMPLE

A contact lens having a thickness of 5 millimeters and a diameter of 20 millimeters contains organopolysiloxane elastomer which has been cross-linked with benzoyl peroxide. The lens is placed upon an electrically conducting carrier which is connected with a source of electrical current. The convex surface of the lens, that is, the surface which is adapted to face the eyelid of a user, faces outwardly of the carrier and is exposed whereas the concave surface of the lens, that is, the surface of the lens which is adapted to face the cornea of the eye, is not exposed. An electrically conducting plate, which is likewise connected with the source of electrical current, is positioned opposite the carrier. The carrier and the plate form the electrodes of a glow discharge arrangement and are arranged in a suitable vessel. The distance between the carrier and the plate is approximately 25 centimeters. In operation, the vessel is evacuated. After a pressure of about $10^{-2}$ torr has been reached, the vessel is purged with pure oxygen. Subsequently, the oxygen present in the vessel by virtue of the purging procedure is evacuated and pure oxygen is again admitted into the vessel until atmospheric pressure has been reached once more. Thereafter, the vessel is again evacuated and the pressure in the vessel is adjusted to approximately $10^{-1}$ torr. Upon the application of a potential, a glow is immediately obtained. The current density is about 1 milliampere per square centimeter and, after two minutes at this current density, the treatment is stopped. The convex surface of the thus-treated contact lens is found to have good wettability and is resistant to mechanical stress such as is obtained, for instance, by rubbing with the fingertips for cleaning purposes. Medical experiments show that there is no reduction in physiological compatibility. Subsequent to the treatment of the convex surface of the lens, the lens is turned around so that the concave surface thereof is exposed. The concave surface of the lens is then subjected to the same treatment as the convex surface thereof using the identical parameters. The only difference resides in that the concave surface of the lens is treated for a period of 15 seconds instead of two minutes. Such a lens is worn by an experimental person without a foreign body sensation.

It will be understood that each of the elements described above, or two or more together, may also find a useful application in other types of articles differing from the types described above.

While the invention has been illustrated and described as embodied in a contact lens having at least one hydrophilic surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A contact lens, comprising a body which includes a silicone elastomer and silicone dioxide as a filler, said body having a concave surface adapted to face the cornea of an eye, and said body having a convex surface adapted to face the eyelid, said convex surface possessing hydrophilic characteristics, and the contact angle for said convex surface being smaller than the contact angle for said concave surface, said contact angles being measured with distilled water, and said contact angle for said concave surface having a value such that said body is movable relative to the cornea of an eye when said body is positioned on the cornea, said convex surface having been made hydrophilic by a treatment which included subjecting said convex surface to the action of activated gas ions in an atmosphere consisting at least predominantly of oxygen when said convex surface had an outer layer of said silicon elastomer, and said gas ions having impinged first regions of said outer layer and having had an energy such that said outer layer was destroyed at said first regions and the silicon dioxide filler of said body was exposed at said first regions, said gas ions also having impinged second regions of said outer layer and having had an energy such that said outer layer transformed to silicon dioxide at said second regions, and said convex surface having undergone an improvement in the hydrophilic characteristics thereof due to the exposure of the silicon dioxide filler at said first regions and the transformation to silicon dioxide at said second regions.

2. A lens as defined in claim 1, said impingements imparting a roughened texture to said convex surface; and wherein said treatment is carried out in such a manner that substantially the entire surface area of the convex surface of said body has a roughened texture.

3. A lens as defined in claim 1, wherein said concave surface has been subjected to said treatment.

4. A lens as defined in claim 3, impingements imparting a roughened texture to said surfaces; and wherein said treatments of said convex and concave surfaces are carried out in such a manner that substantially the entire surface areas of the concave and convex surfaces of said body have roughened textures.

5. A lens as defined in claim 1, wherein said ions are formed and activated by gaseous discharge and comprise oxygen ions.

6. A lens as defined in claim 1, said silicon elastomer including a silicon-oxygen and a silicon-carbon bond;

and wherein the kinetic energy of said ions is at least equal to the energy of one of said bonds.

7. A lens as defined in claim 6, wherein said kinetic energy is between about 3 and 50 electron volts.

8. A lens as defined in claim 1, wherein the pressure in said atmosphere is between about $10^{-1}$ and $10^3$ torr.

9. A lens as defined in claim 1, wherein said atmosphere consists essentially of oxygen.

10. A lens as defined in claim 1, wherein said convex surface is contacted with water subsequent to subjecting said convex surface to said action.

11. A lens as defined in claim 10, wherein the contacting step is carried out for a period of at least 12 hours.

12. A lens as defined in claim 10, wherein said water is in the form of water vapor.

13. A lens as defined in claim 1, said concave surface having been subjected to said treatment, and said impingements imparting a roughened texture to said surfaces; and wherein the roughness of said convex surface exceeds the roughness of said concave surface.

14. A lens as defined in claim 13, wherein the roughness of said convex surface is of the order of micron.

15. A lens as defined in claim 13, wherein the roughness of said concave surface is a maximum of about 0.5 microns.

16. A lens as defined in claim 15, wherein the roughness of said concave surface is a maximum of about 0.2 microns.

17. A lens as defined in claim 1, wherein said contact angle for said convex surface is at most about 65°.

18. A lens as defined in claim 17, wherein said contact angle for said convex surface is a minimum of about 10°.

19. A lens as defined in claim 18, wherein said contact angle for said convex surface is between about 30° and 45°.

20. A lens as defined in claim 1, wherein said contact angle for said concave surface is at most about 75°.

21. A lens as defined in claim 20, wherein said contact angle for said concave surface is a minimum of about 60°.

22. A lens as defined in claim 21, wherein said contact angle for said concave surface is a minimum of about 70°.

23. A lens as defined in claim 1, wherein said contact angles for said surface portions differ by a minimum of about 10°.

24. A lens as defined in claim 1, wherein said contact angles for said surface portions differ by a minimum of about 5°.

* * * * *